US012732095B2

(12) United States Patent
Strzalkowski

(10) Patent No.: US 12,732,095 B2
(45) Date of Patent: Sep. 8, 2026

(54) METHOD AND MEANS OF DEAD TIME REDUCTION IN HALF BRIDGE TOPOLOGY

(71) Applicant: Analog Devices International Unlimited Company, Limerick (IE)

(72) Inventor: Bernhard Strzalkowski, County Limerick (IE)

(73) Assignee: ANALOG DEVICES INTERNATIONAL UNLIMITED COMPANY, County Limerick (IE)

( * ) Notice: Subject to any disclaimer, the term of this patent is extended or adjusted under 35 U.S.C. 154(b) by 258 days.

(21) Appl. No.: 18/504,025

(22) Filed: Nov. 7, 2023

(65) Prior Publication Data

US 2024/0235381 A1 Jul. 11, 2024

Related U.S. Application Data

(60) Provisional application No. 63/437,329, filed on Jan. 5, 2023.

(51) Int. Cl.
*H02M 1/38* (2007.01)
*H02M 1/08* (2006.01)
*H02M 7/537* (2006.01)

(52) U.S. Cl.
CPC ............... *H02M 1/38* (2013.01); *H02M 1/08* (2013.01); *H02M 7/537* (2013.01)

(58) Field of Classification Search
CPC .......... H02M 1/38; H02M 1/08; H02M 7/537; H03K 17/162; H03K 17/284
See application file for complete search history.

(56) References Cited

U.S. PATENT DOCUMENTS 9,876,425 B2 1/2018 Grezaud et al.
11,462,993 B2 * 10/2022 Schmid .................. H02M 1/38
2010/0020569 A1 * 1/2010 Melanson .............. H02M 1/42
363/21.03
2023/0361670 A1 * 11/2023 Dobos ..................... H02M 1/38
2025/0038643 A1 1/2025 Sato

FOREIGN PATENT DOCUMENTS

JP 5298679 B2 9/2013
WO WO-2021117574 A1 * 6/2021 ............ H02M 3/155
WO WO-2023100318 A1 * 6/2023 ............. H02M 3/01

OTHER PUBLICATIONS

Extended European Search Report dated Apr. 26, 2024 in connection with European Application No. 23211016.3.

(Continued)

*Primary Examiner* — Monica Lewis
*Assistant Examiner* — Jye-June Lee
(74) *Attorney, Agent, or Firm* — Knobbe, Martens, Olson & Bear, LLP

(57) ABSTRACT

In a first aspect, there is provided a method of controlling a power converter or a power inverter, comprising: using a comparator to detect a negative voltage drop at a gate of a passive switch device, the negative voltage drop being indicative of an active switch device turning off; applying an adjustment time to a predetermined turn on time of the passive switch device so as to reduce the resultant dead time; and turning on the passive device once the resultant dead time has elapsed.

20 Claims, 9 Drawing Sheets

(56) References Cited

OTHER PUBLICATIONS

Niwa et al., A Dead-Time-Controlled Gate Driver Using Current-Sense FET Integrated in SiC MOSFET. IEEE Transactions on Power Electronics. Apr. 2018;33(4):3258-67.
Strzalkowski, New control method of adaptive dead time for high efficient forward converter. Analog Devices.2012; 8 pages.
Office Action Issued in EP Application No. 23211016.3 dated Oct. 15, 2025 in 5 pages.

* cited by examiner

METHOD AND MEANS OF DEAD TIME REDUCTION IN HALF BRIDGE TOPOLOGY

CROSS-REFERENCE TO RELATED APPLICATION

This application claims the benefit under 35 U.S.C. § 119(e) of U.S. Provisional Patent Application Ser. No. 63/437,329, filed on Jan. 5, 2023, and entitled "METHODS AND MEANS OF DEAD TIME REDUCTION IN HALF BRIDGE TOPOLOGY," which is hereby incorporated herein by reference in its entirety.

FIELD

This application relates to half-bridge circuitry and, in particular but not exclusively, to a half-bridge circuit and method of operation thereof that reduces dead time.

BACKGROUND

Power converters are electrical devices that convert alternating current (AC) into direct current (DC). Power inverters are electrical devices that convert DC into AC. Power converters and inverters usually both consists of one or more half-bridge circuits including gate drivers and power switches, such as transistors.

Half-bridge circuits require two diodes and two switches that are connected in anti-parallel. The two switches are complementary switches in the sense that when the first switch is ON, the second switch is OFF, and vice versa.

Since propagation delays of the gate drivers and the power switches varies, some dead time between turn-OFF of the first switch and turn-ON of the second switch is required in order to avoid cross conduction in the half-bridge configuration, i.e. when the two switches are both ON simultaneously, this may lead to increased losses, 'shoot-through' and potentially cause damage to the switches. Typically, the dead time may be programmed in to circuits by the manufacturer. However, the dead time needs to be kept as short as possible in order to increase power efficiency and control performance of the half-bridge circuit.

Some attempts have been made to try and reduce or shorten dead time that are based on adaptive or dynamic dead time adjustment by continuous monitoring voltage and current of the power switches. However, when considering that SiC- and GaN-switch technologies can have switching times of tens of nanoseconds, said monitoring can become challenging. In some modern power inverters utilizing SiC switches, the dead time is typically fixed to a value between 500 ns-1000 ns by a control unit (for example, a master processor). This is relative long time period relative to the tolerances of some switches, drivers, passive components etc. In particular, wide band gap devices have high voltage drop in reverse mode, when the body diode is conducting. Moreover, the propagation times of monitoring and signal processing may be too long for real time dead time correction. Thus, improved methods taking into account the bandwidth of monitoring and signal processing circuitry could help to minimize dead time.

SUMMARY OF THE DISCLOSURE

Half-bridge circuits behave differently during turn-ON and turn-OFF. In a half bridge circuit, there may be one switch on the high side that is referred to as an active device and one switch on the low side that is referred to a passive device. The following description assumes this terminology. However, it will be appreciated that the opposite could also be true, i.e. there may be one switch on the low side that is referred to as an active device and one switch on the high side that is referred to a passive device. When the active device turns-OFF, the passive device turns-ON, and vice versa.

The present disclosure relates to improved methods for turn-ON and turn-OFF of a half-bridge circuit, respectively, that offers reduced dead time.

In a first method, the active switch turns-OFF, and the passive switch turns-ON.

The precise time to turn-ON the passive device is derived using a signal coming from the active device. Precise signal conditioning and adaptive time delay allows minimization of dead time in the first method.

When the active switch turns-OFF, voltage on the passive device drops, causing a change in voltage over time of −du/dt. This −du/dt causes a negative voltage drop on the gate of the passive device. A comparator, preferably a fast comparator, may be used to detect and identify the gate driver to become the passive device. The comparator may also detect the negative voltage, or an additional negative voltage drop in the case that the steady state voltage is already negative, at the gate and trigger an adjustment time, Tadj, to be applied. Tadj, represents a delay time period depending on the values of IL and Ulink. The gate driver could have means for in situ IL and Ulink measurement or the values can be provided by microcontroller, which may preferably be a master controller. The present inventor has recognised that a minimum dead time in a half bridge circuit may be almost linear proportional to the link voltage and inversely proportional to the phase current. Ulink and IL change slowly, thus they can be measured precisely inside a gate driver. Therefore, according to the present disclosure, the adjustment time, Tadj, may be directly proportional to the Ulink (Tadj=Ku*Ulink) and inversely proportional to IL (Tadj=Ki/(IL+Irg), where Irg is constant value depending on a gate resistor value. After Tadj has elapsed, the link voltage may approach 0 and the gate driver turns-ON the passive device. This is the time instant, where the switch current commutates from the active device to the passive device, almost without any dead time. The Tadj time can be calculated or can be taken from a look-up table.

Therefore, dead time is reduced for the turn-ON operation using techniques of the present disclosure.

In a second method, the passive switch turns-OFF, and the active switch turns-ON.

The precise time to turn-OFF the passive device may be derived from a measurement of the dead time programmed into a microcontroller and knowledge of a propagation delay skew.

In prior art control methods for turn-OFF operations, there may be a fixed dead time between passive device turn-OFF and active device turn-ON (the fixed manufacturer's dead time is also referred to as "Tdcontr"). To minimize the dead time, in the present disclosure, the turn-OFF point is moved or delayed as close as possible to the active switch turns-ON point.

Digital isolator based drivers and couplers may have very tight tolerances on propagation delay (Tprop) and propagation delay skew (Tskew). These times can be used for internal signal processing inside of gate drivers. When having both input signals (PWM, /PWM) on the inputs IN+ and IN−, the gate driver can measure the dead time (or the dead time can be programmed). By knowing the propagation delay skew, the gate driver can calculate (or it can be programmed) the difference in the time period Tdcontr-Tskew. In this way, the time period when the passive device turns-OFF and the active device turns-ON has values between 0 and Tskew. This means that a body diode of the passive device is activated for the period between 0 and Tskew. An additional corrective Tadj may cancel the body diode active time period. The link voltage and phase current values may be directed to the driver's primary side (coming from a host controller) or can be measured on the driver's secondary side directly.

So, a time period of Tdcontrol minus Tskew may be applied in order to delay turn-off. The use of Tadj means that the total dead time for turn-OFF is less than for prior art devices. Further, a time period of Tdcontrol minus (Tskew+Tadjadditional) instead of just Tskew. The additional Tadj reduced dead time even more.

Therefore, dead time is reduced for the turn-OFF operation using techniques of the present disclosure.

In a first aspect, there is provided a method of controlling a power converter or a power inverter, comprising: using a comparator to detect a negative voltage drop at a gate of a passive switch device, the negative voltage drop being indicative of an active switch device turning off; applying an adjustment time to a predetermined turn on time of the passive switch device so as to reduce the resultant dead time; and turning on the passive device once the resultant dead time has elapsed.

In a second aspect, there is provided a method of controlling a power converter or a power inverter, comprising: determining, by a microcontroller, an active switch device turning on; applying an adjustment time to a predetermined turn off time of a passive switch device so as to reduce the resultant dead time; and turning off the passive device once the resultant dead time has elapsed.

In a third aspect, there is provided a half-bridge circuit for a power converter or a power inverter, comprising: a comparator for detecting a negative voltage drop at a gate of a passive switch device; a first switch on the high voltage side, having a source, a gate and a drain; a second switch on the low voltage side, having a source, a gate and a drain; and a microcontroller configured to perform the method steps of any one of the above clauses.

In a fourth aspect, there is provided a half-bridge circuit for a power converter or a power inverter, comprising: a comparator for detecting a negative voltage drop at a gate of a passive switch device; a first switch on the high voltage side, having a source, a gate and a drain; a second switch on the low voltage side, having a source, a gate and a drain; and gate driver circuitry configured to perform the method steps of any one of the above clauses.

Definitions

A half-bridge circuit require two diodes and two power switches that are connected in anti-parallel. The two switches are complementary switches in the sense that when the first switch is ON, the second switch is OFF, and vice versa.

A power switch could be a transistor. For example, the power switch could be a MOSFET or a JFET In a MOSFET, 'dead time' may be defined as the time between high-side turn-OFF and low-side turn-ON, or low-side turn-OFF and high-side turn-ON that is introduced in order to avoid cross conduction in the half-bridge configuration. During dead time, current may still flow through an intrinsic body diode or passive diode connected in parallel with the MOSFET.

Tadj is an adjustment time, which is used to adapt the dead time of a switch in the half bridge circuit. Tadj may be fixed or it may be calculated according to IL and Ulink.

IL is a phase current, for example, a load current.

Ulink is a link voltage of a DC link, which is a connection between two circuits.

Ku is an integer number.

Ki is an integer number.

Irg is a constant current value depending on a gate resistor value.

Tdcontr is a fixed manufacturer's dead time between turn-OFF of one switch and turn-ON of counterpart switch or vice versa, which may be programmed into a gate driver.

Tprop is a propagation time, which may be regarded as an amount of time after an input signal has been applied and stabilises to the time that the output signal of the circuit also stabilises.

Tskew is a propagation delay skew time, which may be regarded as an amount of time for a transmitted signal to be received at the other end of a link or a channel.

BRIEF DESCRIPTION OF THE DRAWINGS

Aspects of the present disclosure are described, by way of example only, with reference to the following drawings, in which.

DETAILED DESCRIPTION

As described in the background section, power converters and power inverters have a dead time between turn-ON and turn-OFF, and vice versa, so as to avoid the issue of cross conduction. The present inventor has recognised that this dead time may be optimised such that it is reduced compared with prior art devices. The reduction in dead time leads to a faster device.

The present disclosure may be particularly relevant in several applications. For example, different methods are proposed for turn-ON and turn-OFF.

In one method, an (active) switch turns-OFF and a (passive) switch turns-ON. A comparator is used to detect a negative voltage drop at a gate of a passive switch device, the negative voltage drop, or an additional negative voltage drop, being indicative of an active switch device turning off. An adjustment time is applied to a predetermined turn on time of the passive switch device so as to reduce the resultant dead time. Finally, the passive device is turned on once the resultant dead time has elapsed.

In another method, a (passive) switch turns-OFF and an (active) switch turns-ON. A microcontroller is used to determine an active switch device turning on. An adjustment time is applied to a predetermined turn off time of the passive switch device so as to reduce the resultant dead time. Finally, the passive device is turned off once the resultant dead time has elapsed.

In a half-bridge circuit for a power converter or a power inverter, there is included a comparator for detecting a negative voltage at a gate of a passive switch device, a first switch on the high voltage side, having a source, a gate and a drain, a second switch on the low voltage side, having a source, a gate and a drain, and a microcontroller configured to perform the method steps of any one of the above methods.

In another half-bridge circuit for a power converter or a power inverter, there is included a comparator for detecting a negative voltage at a gate of a passive switch device, a first switch on the high voltage side, having a source, a gate and a drain, a second switch on the low voltage side, having a source, a gate and a drain, and gate driver circuitry configured to perform the method steps of any one of the above methods.

These examples are particularly advantageous for dead time reduction in half bridge topologies or other similar circuits.

Figure 1:
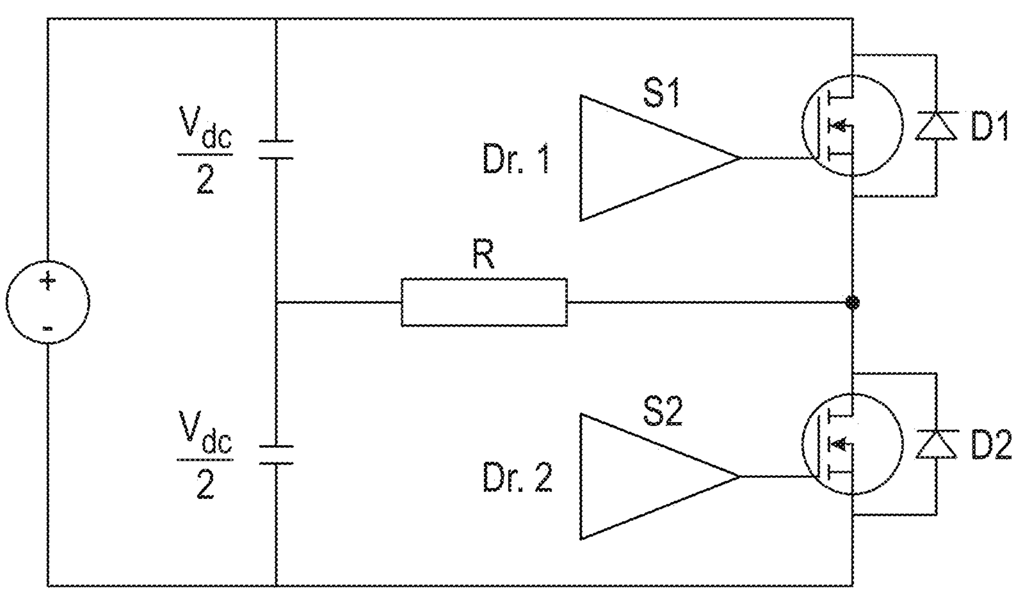
FIG. 1 is a schematic representation of a first half-bridge inverter and a second half-bridge inverter.
Figure 1:
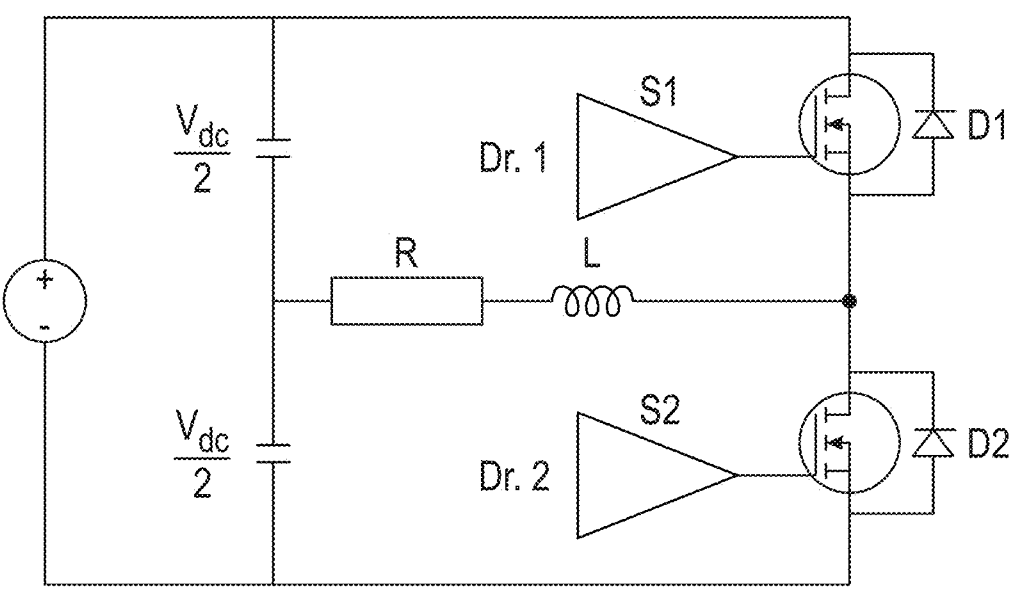

FIG. 1 shows an example representation of a half-bridge inverter with a resistive load and an example representation of a half-bridge inverter with a resistive and inductive load.

In the example with a purely resistive load, S1 is turned-ON from time interval t=0 to t=T/2, during which S2 is turned-OFF. When S1 is turned-ON, the voltage across the load is Vo=Vdc/2 and current flowing through S1 is Io=Vdc/2RL. When S2 is turned-ON from the time interval t=T/2 to t=T, S1 is turned-OFF. To avoid cross conduction, S2 is turned-ON with a delay after S1 is turned-OFF. The voltage across the load is Vo=−Vdc/2 and the current through S2 is Io=Vdc/2RL. The reversal of the current direction indicates DC to AC conversion.

In reality, loads are often not purely resistive and may also contain an inductive element and the current may lag the voltage. Diode D1 conducts when the current is positive and the voltage is negative, whilst diode D2 conducts when the voltage is positive and the current is negative. When S1 is turned-ON, the voltage across the load is Vdc/2 and current gradually increases from zero to a maximum current, whilst the inductor stores energy so long as the polarity of the current and the voltage is the same. When S1 is turned-OFF, the voltage across the load is −Vdc/2 but the direction of flow of current will remain the same owing to the inductor, gradually decreasing until the inductor discharges completely and the load current IL is zero. Then, after a delay to avoid cross conduction, S2 turns-ON and current and voltage of the load is negative, so the inductor charges in this time. When S2 is turned-OFF, the voltage across the load is Vdc/2 and current through the load gradually decreases until it becomes zero.

The above text describes a discontinuous current mode (DCM) device. In contrast to DCM, in a continuous current mode (CCM), current in the inductor doesn't approach 0. CCM is most common in high power application (say, >100 W). Both DCM and CCM devices are applicable to be used in the context of the present disclosure.

Figure 2:
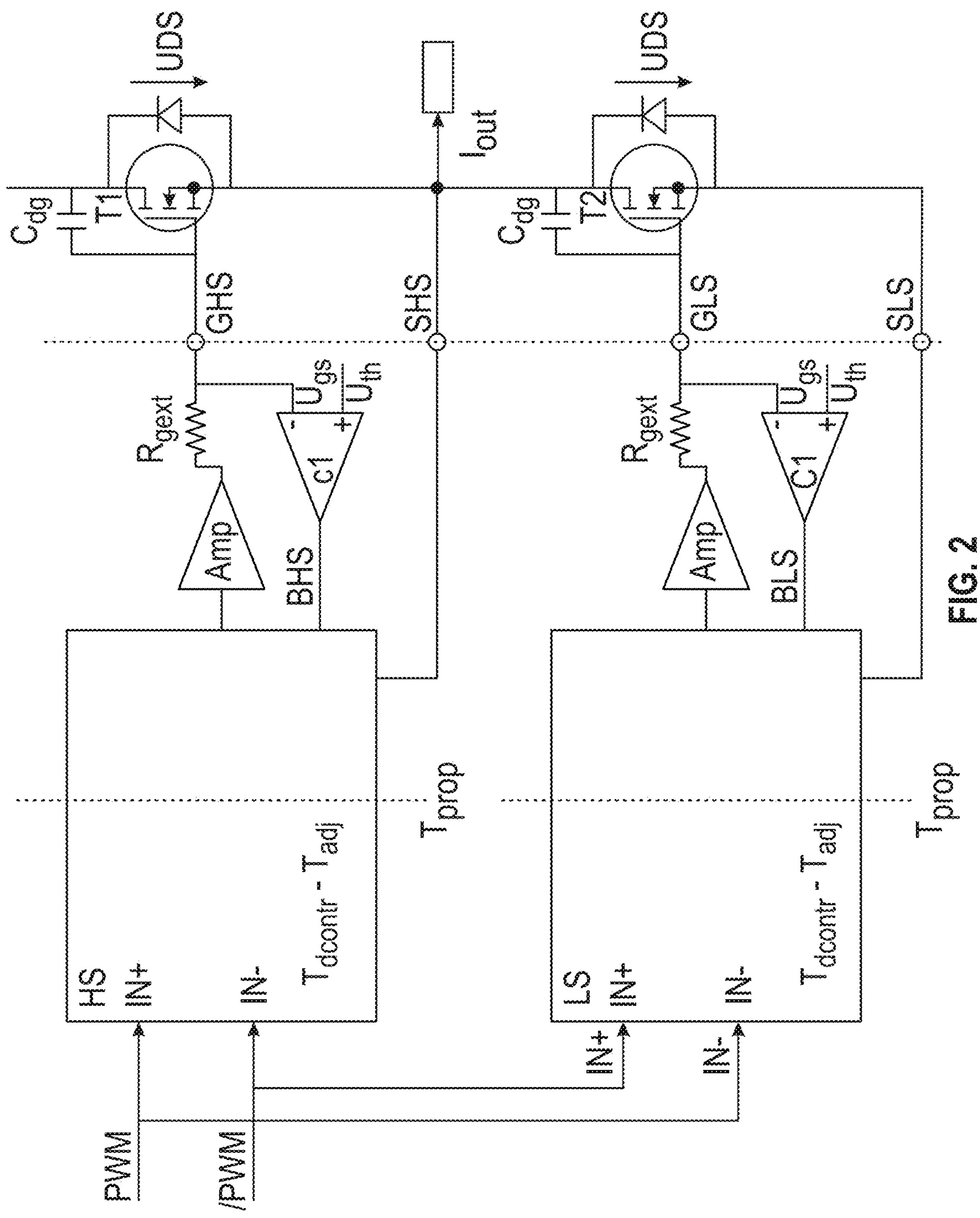
FIG. 2 is a schematic representation of a half-bridge inverter according to an aspect of the present disclosure.

FIG. 2 is a schematic representation of a half-bridge inverter according to an aspect of the present disclosure. In the circuit, there is a MOSFET on the low voltage side T2 and a MOSFET on the high voltage side T1, each having intrinsic body diodes. The load includes an inductive element (hereinafter referred to as the 'inductor').

Figure 3:
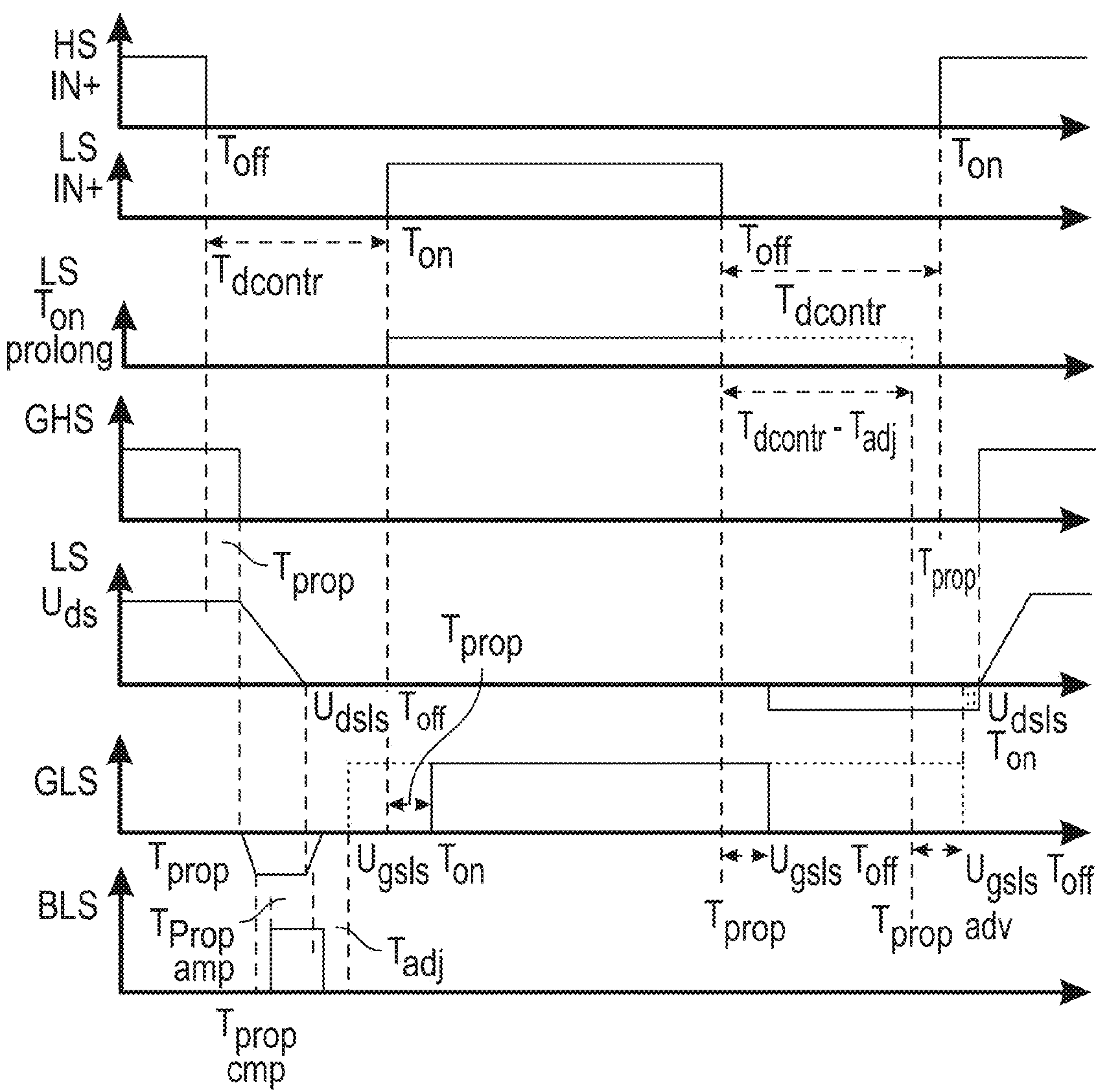
FIG. 3 shows a timing diagram relating to the half-bridge inverter of FIG. 2 according to an aspect of the present disclosure.

As seen in FIG. 3, which is a timing diagram relating to the half-bridge inverter of FIG. 2, when T1 (high) is turned-ON, current flows from the positive node to the inductor. Then, T1 (high) is turned-OFF and, after some propagation delay, the signal at the gate of the high side, or the gate driver of the high side, turns-OFF and the voltage in the middle of the half H-bridges begins to decrease. Because of the negative voltage, and because of the transconductance capacitor between the drain and the gate of T2 (low), the gate voltage becomes a negative value. Comparator C1 detects the negative voltage and after some propagation delay of the comparator, it sends signal BLS to the gate driver and the MOSFET turns-ON its gate in order to short the body diode and to build its channel. This could be done immediately, just taking into account the propagation time of the comparator, but this could be too short and therefore an additional adjustment time is implemented in the gate driver. After both the propagation time and the adjustment time have elapsed, the low side gate driver T2 (low) is turned-ON, whilst still avoiding current through the body diode, which has a large voltage drop that could cause additional power losses. The present method reduces the dead time as much as possible without turning on the body diode. In prior art devices, a longer propagation delay is used without an adjustment to the delay.

In one example, the adjustment delay could be set as a fixed value, if we know the behaviour of the switches.

In another example, the adjustment delay could be adjusted adaptively, based on the output current and the link voltage, as the optimum dead time may change with the current value and the intermediate voltage value. The higher the output current, the smaller the adjustment time required. The higher the intermediate voltage, the larger the adjustment time required.

In a first method, for turn-ON operations, the adjustment time, Tadj, is directly proportional to the Ulink (Tadj=Ku*Ulink) and inversely proportional to IL (Tadj=Ki/(IL+Irg), where Irg is constant value depending on a gate resistor value. After Tadj has elapsed, the gate driver turns-ON the passive device.

Ulink may be a voltage between 100-1000V in some examples. In applications such as industrial applications e.g. power grid and high voltage lines, Ulink may be up to 10,000V.

Tadj may be in the range of 1 ns and 100 ns. As mentioned above, Tadj may be dependent upon Ulink.

IL may be in the range of 10-1000 A, or up to 10,000 A in industrial applications.

Turning now to the second method, when the channel is switched-OFF on the low side, after some propagation delay, current starts to flow in the intrinsic diode, causing additional losses. To avoid this, turn-ON time of the low side is prolonged by a dead time predetermined by the manufacturer (also referred to as a 'control time') minus an adjustment time.

It should be understood that for the turn-OFF operations, the adjustment time is not linked to the adjustment time for turn-ON operations. The adjustment delay could be implemented by a microcontroller or it could be implemented by the gate driver.

Figure 4:
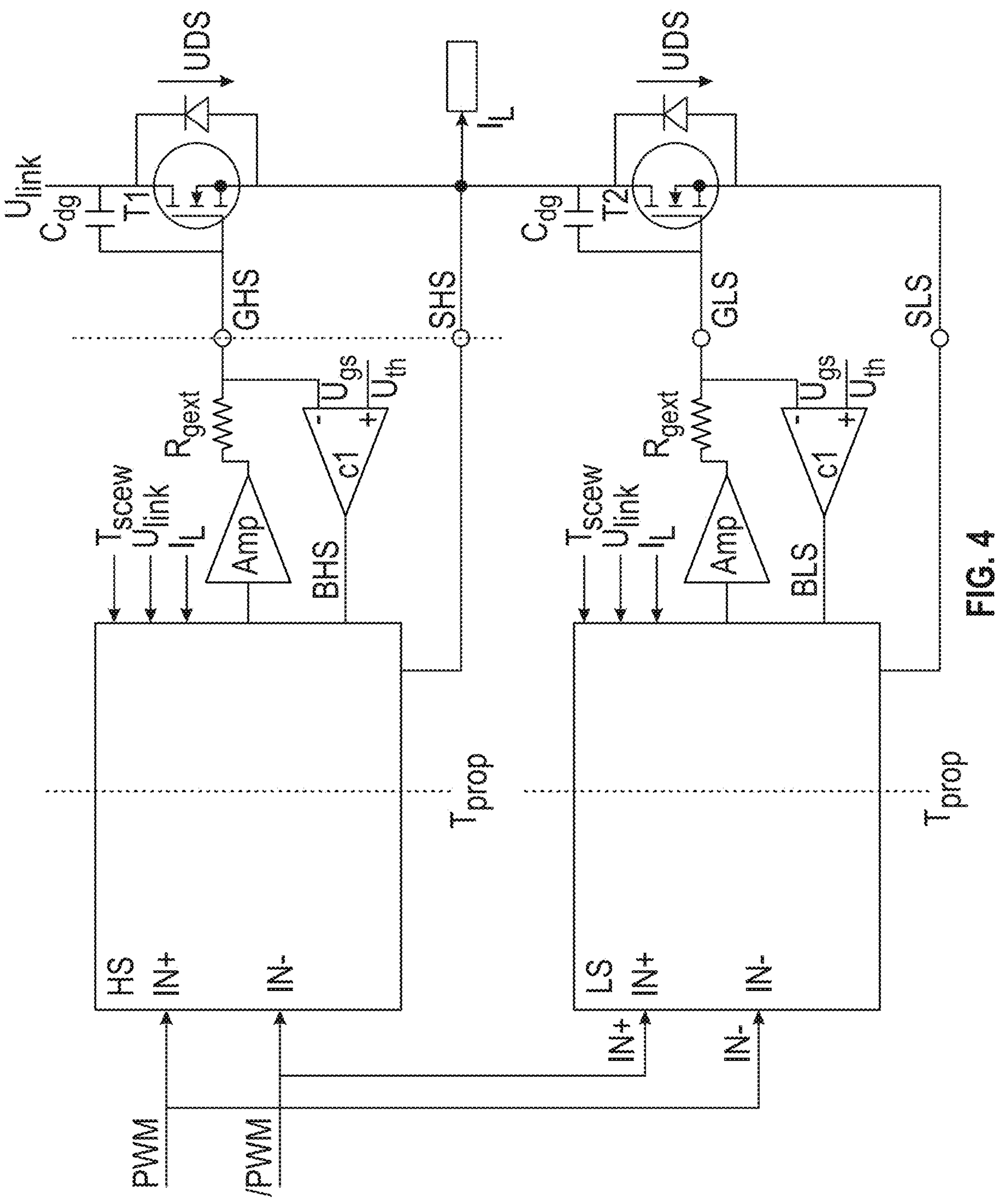
FIG. 4 is a schematic representation of a half-bridge inverter according to an aspect of the present disclosure.

FIG. 4 is a schematic representation of a half-bridge inverter according to an aspect of the present disclosure. Relative to FIG. 2, it shows signals representative of the skew time, the link voltage, Ulink, and IL as inputs to the gate driver circuitry on each the high side and the low side.

Figure 5:
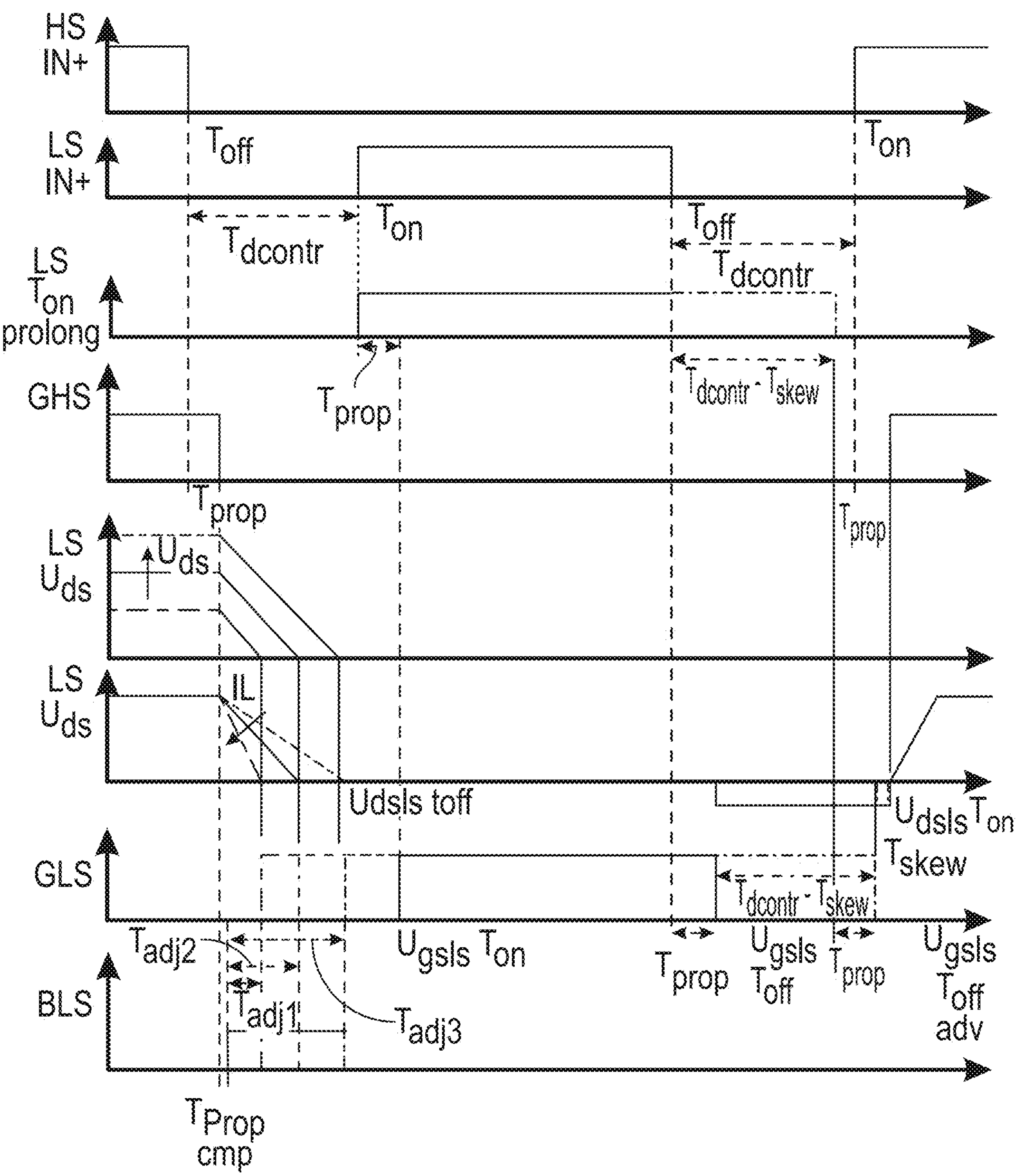
FIG. 5 shows a timing diagram relating to the half-bridge inverter of FIG. 4 according to an aspect of the present disclosure.

As seen in FIG. 5, which a timing diagram relating to the half-bridge inverter of FIG. 4, by changing Uds on the low side and/or IL on the low side, different values of Tadj may be calculated. The values Tadj1 represents the period for maximum IL and/or for minimum Ulink. The values Tadj3 represents the period for minimum IL (0 A) and/or for maximum Ulink. In FIG. 5, Tadjadditional=0, so the delay is (Tdcontr−Tskew).

Tdcontrol could be programmable or may be calculated by knowing the high side and the low side.

Tdcontrol may be in the range 100 ns-1000 ns. Tskew may be in the range 10-100 ns. In the case where an additional Tadj, Tadjadditional may also be in the range 10-100 ns.

Figure 6:
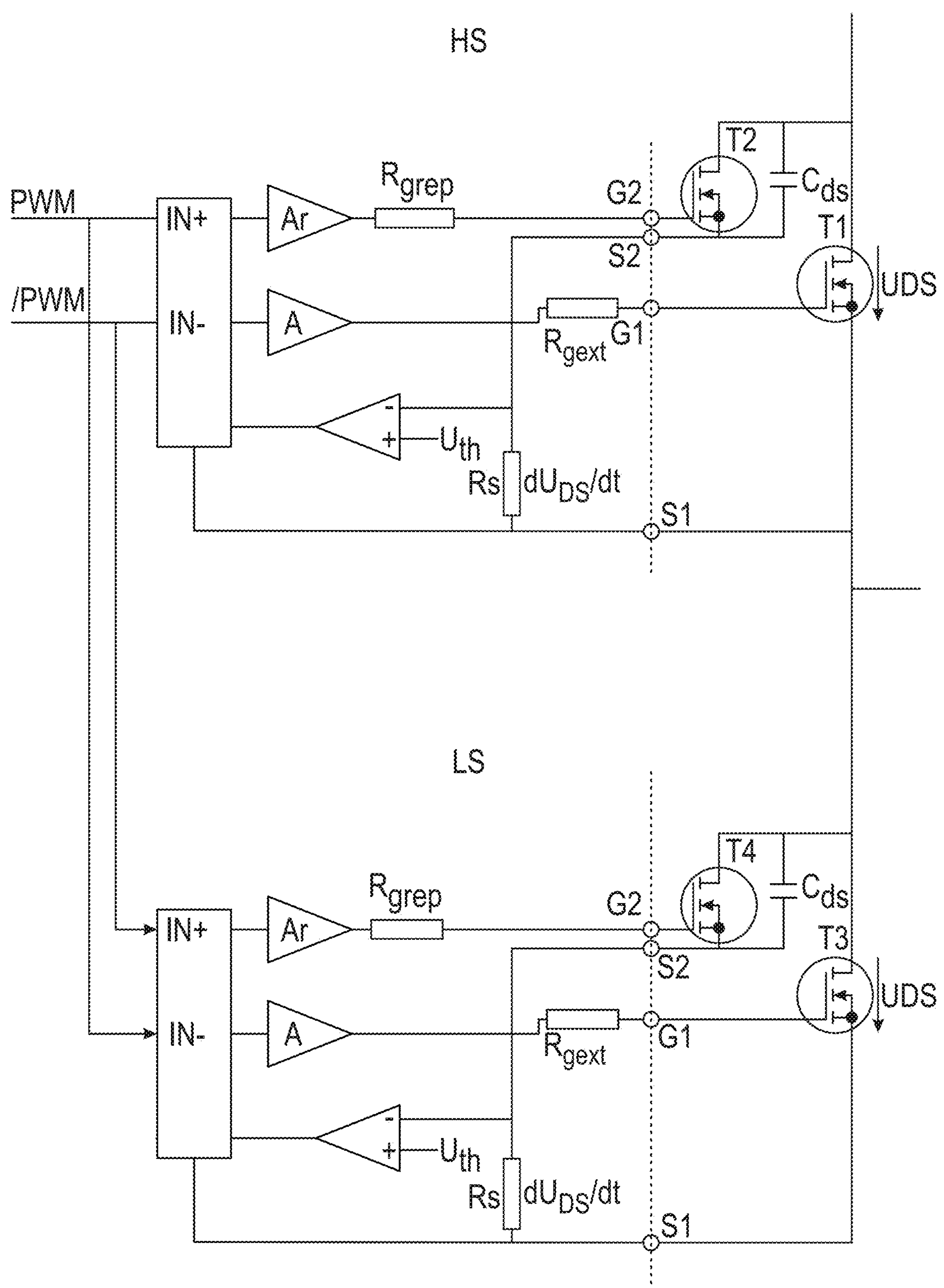
FIG. 6 is a schematic representation of a half-bridge inverter according to an aspect of the present disclosure.

FIG. 6 is a schematic representation of a half-bridge inverter according to an aspect of the present disclosure. Transistors T2 may be temperature sensors on the high side and T4 on the low side for additional measurement protection. Transistors T2 may also be replica devices/circuits of the switches T1, resulting in a much higher signal at the comparators C1. The drain source capacitor Cds on the transistors T2 can be used to detect a negative voltage on gate more accurately. By using the comparators C1, signal reduction at the gate resistors RdUds/dt (which are high ohmic resistors and are connected to the amplifiers/reference ground to the gate drivers) is avoided. This is contrasted to FIG. 4, for example, in which there is low ohmic resistance at the gate resistors Rgext, which means that the negative signal is comparatively weak. Thus, the signal levels reaching the gate resistors RdUds/dt of FIG. 6 are higher than in the case without use of the transistors T2. Thus, more reliable signal detection may be achieved.

Figure 7:
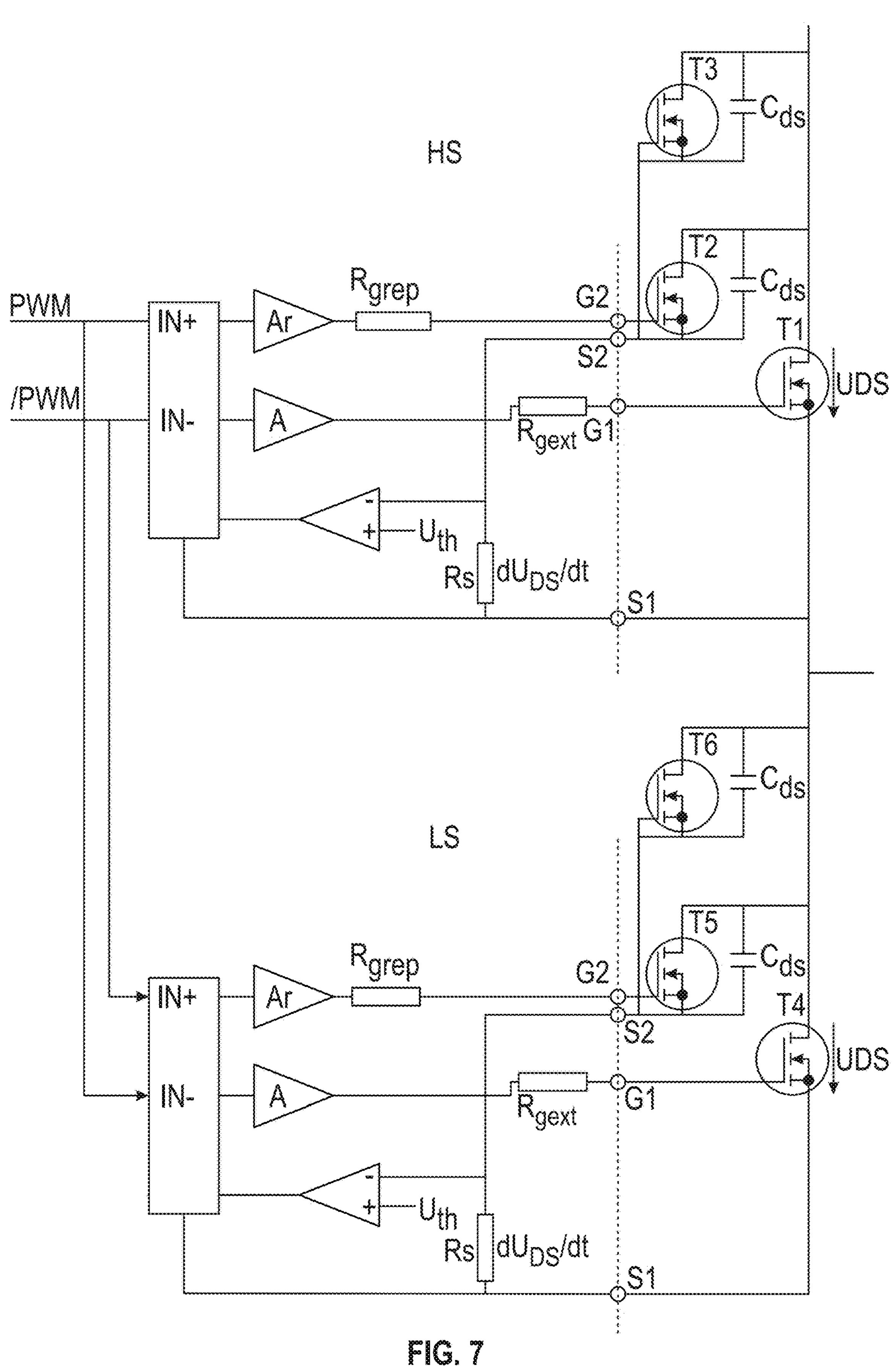
FIG. 7 is a schematic representation of a half-bridge inverter according to an aspect of the present disclosure.

FIG. 7 is a schematic representation of a half-bridge inverter according to an aspect of the present disclosure. Relative to FIG. 6, a dummy replica transistor T3 is added. It may be used with high voltage capacitors Cds or/and Cdg. The drain source of the dummy replica transistor T3 is used to increase the negative voltage signal that is being detected. Thus, accuracy, reliability and EMI behaviour may be improved, and more reliable signal detection may be achieved.

The dotted vertical line in each of FIGS. 2, 4, 6 and 7 represents the access nodes to the components in the package (not that the nodes are physically connected).

Figure 8:
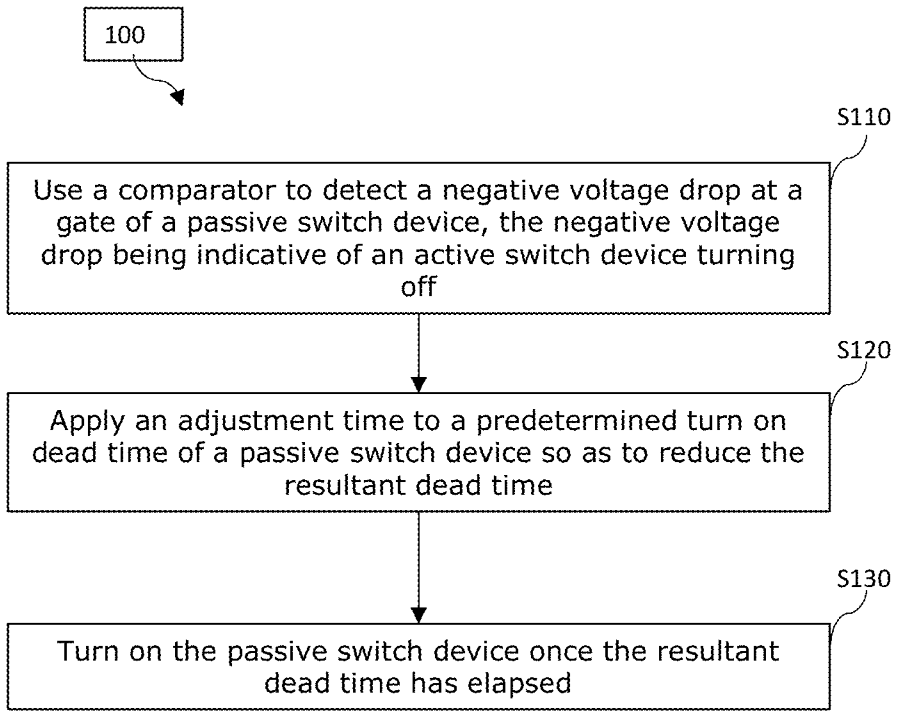
FIG. 8 represents example method steps according to an aspect of the present disclosure.

FIG. 8 represents example method steps 100 according to an aspect of the present disclosure. In general, at step S110, a comparator is used to detect a negative voltage at a gate of a passive switch device, the negative voltage being indicative of an active switch device turning off. Then, at step S120, an adjustment time is applied to a predetermined turn on time of the passive switch device so as to reduce the resultant dead time. Finally, at step S130, the passive switch device is turned on once the resultant dead time has elapsed.

Figure 9:
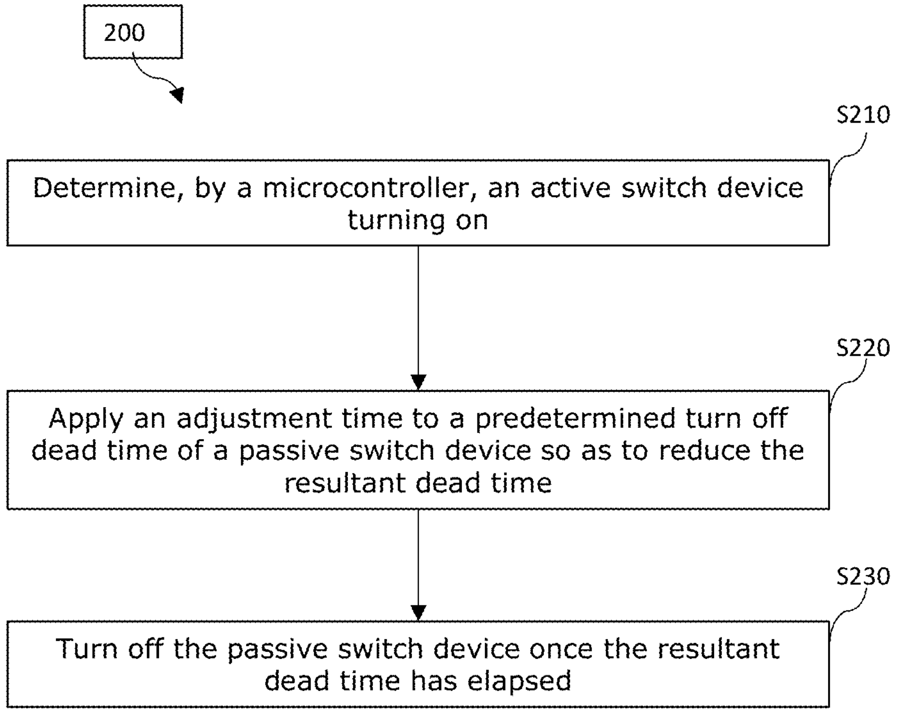
FIG. 9 represents example method steps according to an aspect of the present disclosure.

FIG. 9 represents example method steps 200 according to an aspect of the present disclosure. In general, at step S210, a microcontroller is used to determine an active switch device turning on. Then, at step S220, an adjustment time is applied to a predetermined turn on time of a passive switch device so as to reduce the resultant dead time. Finally, at step S230, the passive switch device is turned off once the resultant dead time has elapsed.

The skilled person will readily appreciate that various alterations or modifications may be made to the above described aspects of the disclosure without departing from the scope of the disclosure.

The devices described above may be a power converter or a power inverter. The load may be resistive and/or inductive. The switches may be any of the types mentioned above, for example, MOSFETs.

In some embodiments, there is provided a half-bridge circuit for a power converter or a power inverter, comprising: a comparator for detecting a negative voltage drop at a gate of a passive switch device; a first switch on the high voltage side, having a source, a gate and a drain; a second switch on the low voltage side, having a source, a gate and a drain; and a microcontroller configured to perform any one of the steps of any one of the methods described herein.

In some embodiments, there is provided a half-bridge circuit for a power converter or a power inverter, comprising: a comparator for detecting a negative voltage drop at a gate of a passive switch device; a first switch on the high voltage side, having a source, a gate and a drain; a second switch on the low voltage side, having a source, a gate and a drain; and gate driver circuitry configured to perform any one of the steps of any one of the methods described herein.

What is claimed is:

1. A method of controlling a power converter or a power inverter, comprising:

using a comparator to detect a negative voltage drop at a gate of a passive switch device, the negative voltage drop being indicative of an active switch device turning off;

applying an adjustment time when the negative voltage drop is detected so as to reduce a predetermined dead time between the active switch device turning off and the passive switch device turning on; and turning on the passive switch device once the adjustment time has elapsed.

2. The method according to claim 1, wherein the adjustment time is set as a fixed value.

3. The method according to claim 1, wherein the adjustment time is calculated adaptively based on a phase current of the load.

4. The method according to claim 3, wherein the adjustment time is inversely proportional to the phase current of the load.

5. The method according to claim 1, wherein the adjustment time is calculated adaptively based on a link voltage of the power converter or the power inverter.

6. The method according to claim 5, wherein the adjustment time is directly proportional to the link voltage.

7. The method according to claim 1, wherein the adjustment time is applied by a gate driver of the passive switch device.

8. The method according to claim 1, wherein the adjustment time is applied by a microcontroller or internal circuitry of the gate driver.

9. The method according to claim 1, wherein the adjustment time is calculated or taken from a look-up table.

10. The method according to claim 1, wherein the predetermined dead time is a fixed dead time that is programmed in by a manufacturer.

11. A method of controlling a power converter or a power inverter, comprising:

receiving a turn-off command signal from a microcontroller, the turn-off command indicating that a passive switch device should be turned off;

prolonging a time of the passive switch device turning off by a predetermined dead time minus an adjustment time;

turning off the passive switch device at the prolonged time; and turning on the active switch device after receiving a turn-on command signal from the microcontroller.

12. The method according to claim 11, wherein the adjustment time is set as a fixed value.

13. The method according to claim 11, wherein the adjustment time is calculated adaptively based on at least one of a propagation delay skew time or an additional adjustment time.

14. The method according to claim 11, wherein the adjustment time is calculated adaptively based on the predetermined dead time minus a propagation delay skew time.

15. The method according to claim 11, wherein the adjustment time is calculated based on the predetermined dead time minus a combination of a propagation delay skew time and an additional adjustment time.

16. The method according to claim 11, wherein the adjustment time is applied by the microcontroller or internal circuitry of the gate driver.

17. The method according to claim 11, wherein the adjustment time is calculated or taken from a look-up table.

18. The method according to claim 11, wherein the predetermined dead time is a fixed dead time that is programmed in by a manufacturer.

19. A half-bridge circuit for a power converter or a power inverter, comprising:

an active switch device on a high voltage side;

a passive switch device on a low voltage side;

a comparator for detecting a negative voltage drop at a gate of the passive switch device, the negative voltage drop being indicative of the active switch device turning off; and gate driver circuitry configured to perform:

applying an adjustment time when the negative voltage drop is detected so as to reduce a predetermined dead time between the active switch device turning off and the passive switch device turning on; and turning on the passive switch device once the adjustment time has elapsed.

20. The half-bridge circuit according to claim 19, wherein the adjustment time is set as a fixed value.

* * * * *